United States Patent
Zhang et al.

(10) Patent No.: US 11,129,086 B2
(45) Date of Patent: Sep. 21, 2021

(54) SYSTEM MESSAGE NOTIFICATION AND SENDING METHOD AND APPARATUS

(71) Applicant: CHINA ACADEMY OF TELECOMMUNICATIONS TECHNOLOGY, Beijing (CN)

(72) Inventors: Dajun Zhang, Beijing (CN); Aijuan Liu, Beijing (CN); Ying Wang, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 7 days.

(21) Appl. No.: 16/619,456

(22) PCT Filed: Apr. 23, 2018

(86) PCT No.: PCT/CN2018/084062
§ 371 (c)(1),
(2) Date: Dec. 4, 2019

(87) PCT Pub. No.: WO2018/228055
PCT Pub. Date: Dec. 20, 2018

(65) Prior Publication Data
US 2020/0162998 A1    May 21, 2020

(30) Foreign Application Priority Data
Jun. 15, 2017  (CN) .......................... 201710454004.0

(51) Int. Cl.
*H04W 48/10* (2009.01)
*H04W 88/08* (2009.01)
(52) U.S. Cl.
CPC .......... *H04W 48/10* (2013.01); *H04W 88/085* (2013.01)

(58) Field of Classification Search
None
See application file for complete search history.

(56) References Cited

U.S. PATENT DOCUMENTS

2013/0235839 A1* 9/2013 Kim ...................... H04L 5/0092
                                                370/329
2018/0338277 A1* 11/2018 Byun ................ H04W 74/0833

FOREIGN PATENT DOCUMENTS

CN    101610098 A    12/2009
CN    102104855 A    6/2011
(Continued)

OTHER PUBLICATIONS

NTT Docomo, Inc. "CU-DU interface: Overall categorization of C-plane and U-plane", TSG-RAN Working Group 3 meeting #95, Athens, Greece, Feb. 13-17, 2017, total 9 pages, R3-170618.

(Continued)

*Primary Examiner* — Hong S Cho
(74) *Attorney, Agent, or Firm* — Kilpatrick Townsend & Stockton LLP

(57) ABSTRACT

Disclosed are a system message notification and sending method and apparatus. The method comprises: a CU determines system message relevant information; and the CU sends the system message relevant information to a DU. The DU receives the system message relevant information sent by the CU; and the DU notifies a terminal of the information. The present application provides an access control and system message processing solution under a CU-DU architecture, and a CU can provide sufficient auxiliary information to a DU, and thus the DU can generate suitable system information according to same. The two coordinate to provide a service to a UE, and the system efficiency is improved and a good user experience is ensured.

15 Claims, 5 Drawing Sheets

(56) References Cited

FOREIGN PATENT DOCUMENTS

| | | | |
|---|---|---|---|
| CN | 106102106 A | 11/2016 | |
| CN | 106162730 A | 11/2016 | |
| CN | 107360557 A | 11/2017 | |
| CN | 107872876 A | 4/2018 | |
| EP | 2947953 A1 | 11/2015 | |
| EP | 3079407 A1 | 10/2016 | |
| JP | 2015507434 A | 3/2015 | |
| WO | 2010032477 A1 | 3/2010 | |

OTHER PUBLICATIONS

Huawei "Considerations on the control plane functions located in DU", 3GPP TSG-RAN3 Meeting#95bis, Spokane, USA, Apr. 3-7, 2017, total 3 pages, R3-171220.

CATT,"Stage 2 TP for RRC message transfer between CU and DU", 3GPP TSG-RAN WG3 Meeting#96, Hangzhou, China, May 15-19, 2017, total 3 pages, R3-171460.

CATT,"Stage 3 TP for RRC message transfer in F1 interface", 3GPP TSG-RAN WG3 Meeting#96, Hangzhou, China, May 15-19, 2017, tote; 3 pages, R3-171461.

CATT, "Control plane for support of NR standalone operation", 3GPP TSG RAN WG2 Meeting #94, R2-163468, Nanjing, China, May 23-27, 2016.

CATT, Consideration on the RRC message transfer between CU and DU, 3GPP TSG RAN WG3 Meeting #96, R3-171456, Hangzhou, China, May 15-19, 2017.

\* cited by examiner

SYSTEM MESSAGE NOTIFICATION AND SENDING METHOD AND APPARATUS The present application is a national stage of International Application No. PCT/CN2018/084062, filed on Apr. 23, 2018, claiming priority to Chinese Patent Application No. 201710454004.0, filed with the Chinese Patent Office on Jun. 15, 2017 and entitled "System Message Notification and Sending Method and Apparatus", the content of which is hereby incorporated by reference in its entirety.

FIELD

The present application relates to the field of wireless communication technologies, and particularly to a system message notification and sending method and apparatus.

BACKGROUND

FIG. 1 is a schematic diagram of the LTE network architecture. As shown, in the existing mobile communication LTE (Long Term Evolution) system, most of the nodes at the network side are connected via wired connections, that is, the eNBs (Evolved NodeBs) are connected via the wired links, and the eNB and the core network node (e.g., MME (Mobility Management Entity), S-GW (Serving Gateway) or the like) are also connected via the wired links.

In the existing access control and system information processing, the eNB is generally a single node or consisted of the nodes connected by the ideal backhaul. The SIB2/14 (SIB: System Information Block) for each cell contains the broadcast information related to the access control, e.g., ac-BarringInfo (access barring information) or the like. Once the UE (User Equipment) in the idle state receives the service establishment request, the UE may trigger the blocking operation for the corresponding service. Once blocked, the service failure may be notified to the upper layer. Otherwise, the normal service establishment procedure may be performed.

FIG. 2 is a schematic diagram of the CU-DU architecture. For the CU-DU architecture, the gNB (next generation NodeB) includes the CU (Central Unit) and DU (Distributed Unit) nodes. As shown in FIG. 2, the CU node has the main functions of the gNB, e.g., mobility management and RRC (Radio Resource Control) of the UE and other functions, and the DU node has the sub-functions of the gNB and the operations thereof are controlled by the CU node.

In the prior art, all the RAN (Radio Access Network) operations are completed at the eNB, and the procedures are relatively simple and clear. But after the CU-DU is introduced, there is no solution as to how the CU and DU cooperate with each other to complete the important functions such as access control and system message management.

SUMMARY

The present application provides a system message notification and sending method and apparatus, so as to provide an access control and system message processing solution under the CU-DU architecture.

An embodiment of the present application provides a method of notifying a system message, the method includes: receiving, by a DU, information related to a system message sent by a CU; notifying, by the DU, a terminal of the information.

In an implementation, the information related to the system message is the access control auxiliary information of a part or all of service categories; when the DU notifies the terminal of the information, the DU generates system information related to the system message according to the access control auxiliary information and sends the system information to the terminal.

In an implementation, the method further includes: receiving the access control auxiliary information of the part or all of service categories updated by the CU, generating, by the DU, the system information related to the system message according to the updated access control auxiliary information, and sending the system information to the terminal.

In an implementation, the information related to the system message is a related system message block generated by the CU according to information related to a cell reselection parameter; when the DU notifies the terminal of the information, the DU sends the system message block to the terminal at a corresponding scheduling time.

In an implementation, the system message block is sent by the CU to the DU node in form of container.

In an implementation, the method further includes: after receiving overload information for a particular service category in a cell updated by the CU, sending, by the DU, the overload information to the terminal at the corresponding scheduling time.

An embodiment of the present application provides a method of sending a system message, the method includes: determining, by a CU, information related to a system message;
sending, by the CU, the information related to the system message to a DU.

In an implementation, the information related to the system message is access control auxiliary information of a part or all of service categories.

In an implementation, the method further includes: sending, by the CU, updated access control auxiliary information of the part or all of service categories to the DU.

In an implementation, the information related to the system message is a related system message block generated by the CU according to information related to a cell reselection parameter.

In an implementation, the system message block is sent by the CU to the DU node in form of container.

In an implementation, the method further includes: sending, by the CU, updated overload information for a particular service category in a cell to the DU.

An embodiment of the present application provides an apparatus of notifying a system message, the apparatus includes: a receiving module configured to receive, at a DU, information related to a system message sent by a CU; a notifying module configured to notify, at the DU, a terminal of the information.

In an implementation, the notifying module is further configured, when the information related to the system message is access control auxiliary information of a part or all of service categories, to generate system information related to the system message according to the access control auxiliary information and send the system information to the terminal when notifying the terminal of the information.

In an implementation, the notifying module is further configured to receive the access control auxiliary information of the part or all of service categories updated by the CU, generate the system information related to the system message according to the updated access control auxiliary information, and send the system information to the terminal.

In an implementation, the notifying module is further configured, when the information related to the system message is a related system message block generated by the CU according to information related to a cell reselection parameter, to send the system message block to the terminal at a corresponding scheduling time when notifying the terminal of the information.

In an implementation, the receiving module is further configured to receive the system message block sent by the CU to the DU node in form of container.

In an implementation, the notifying module is further configured, after receiving overload information for a particular service category in a cell updated by the CU, to send the overload information to the terminal at the corresponding scheduling time.

An embodiment of the present application provides an apparatus of sending a system message, the apparatus includes: a determining module configured to determine information related to a system message; a sending module configured to send the information related to the system message to a DU.

In an implementation, the determining module is further configured to determine the information related to the system message as access control auxiliary information of a part or all of service categories.

In an implementation, the sending module is further configured to send updated access control auxiliary information of the part or all of service categories to the DU.

In an implementation, the determining module is further configured to determine the information related to the system message as a related system message block generated by the CU according to information related to a cell reselection parameter.

In an implementation, the sending module is further configured to send the system message block to the DU node in form of container.

In an implementation, the sending module is further configured to send updated overload information for a particular service category in a cell to the DU.

Another apparatus of notifying a system message provided by an embodiment of the present application includes: a memory, used for storing a program instruction; and a processor, used for calling the program instruction stored in the memory to perform operations based on an obtained program, the operations including: receiving information related to a system message sent by a CU; notifying a terminal of the information.

Another apparatus of sending a system message provided by an embodiment of the present application includes: a memory, used for storing a program instruction; and a processor, used for calling the program instruction stored in the memory to perform operations based on an obtained program, the operations including: determining information related to a system message; sending the information related to the system message to a DU.

Another embodiment of the present application provides a computer storage medium storing a computer executable instruction, and the computer executable instruction is used to enable a computer to perform any one of the above-mentioned methods.

The present application has the following beneficial effects.

In the technical solution provided by the present application, the DU notifies the terminal of the information after the DU receives the information related to the system message sent by the CU.

Further, when the information related to the system message is the access control auxiliary information of a part or all of service categories, the DU generates the system information related to the system message according to the access control auxiliary information and then sends the system information to the terminal.

Or, when the information related to the system message is the related system message block generated by the CU according to the information related to the cell reselection parameter, the DU sends the system message block to the terminal at the corresponding scheduling time.

Therefore, this solution provides an access control and system message processing solution under the CU-DU architecture, and the CU can provide the sufficient auxiliary information to the DU and the DU can generate the suitable system information according to the sufficient auxiliary information. Both of them coordinate to provide services for the UE, increasing the system efficiency and ensuring the good user experience.

BRIEF DESCRIPTION OF THE DRAWINGS

The accompanying drawings illustrated here are used to provide the further understanding of the present application and constitute a part of the present application, and the schematic embodiments of the present application and the illustration thereof are used to explain the present application but not limit the present application improperly.

DETAILED DESCRIPTION OF EMBODIMENTS

In the future development of the mobile communication system, in order to better meet the user demands and greatly increase the network capacity and throughput, the more transmission nodes and the larger transmission bandwidth must be introduced. In the 5G network, in order for the larger bandwidth and the larger transmission rate, the introduction of the small high-frequency stations may be an inexorable trend. The locally centralized management of these small high-frequency stations may bring the centralized processing gain, so the CU-DU architecture is introduced. Embodiments of the present application proposes a system message processing solution under the CU-DU architecture to ensure that the CU and DU can work cooperatively to provide timely and efficient access control related information for the user and further increase the usage efficiency the system resources.

Specifically, when the solution involves the access, the CU provides the access control auxiliary information of a part or all of service categories to the DU, and the DU node generates system information related to access control and sends the system information to the UE.

When the reselection is involved, the CU generates information such as intra-frequency/inter-frequency/inter-system cell reselection parameters and generates related system message block, the CU transfers the information to the DU node in form of container, and the DU node sends the information to the UE at the corresponding scheduling time.

Specific embodiments of the present application will be illustrated below in combination with the drawings.

In the illustration process, implementations at the CU and DU sides will be illustrated respectively, and then the example implemented by both of the CU and DU in cooperation is also given to better understand implementations of the solution provided in embodiments of the present application. Such illustration does not mean they must implement in cooperation or must implement alone. Actually, when the CU and DU implement separately, they also solve the problems at the CU and DU sides respectively, but when they are used in combination, the better technical effect may be obtained. In fact, embodiments in which the CU and DU coordinate with the terminal may also be given in examples.

Figure 1:
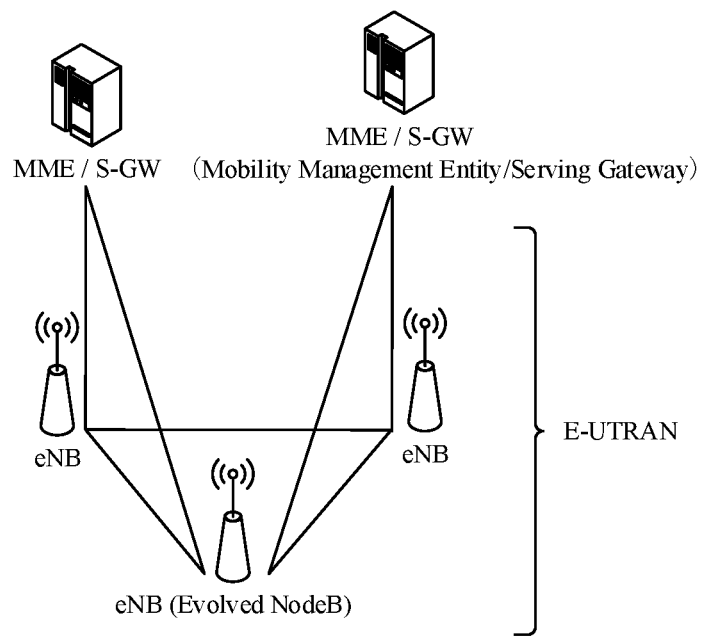
FIG. 1 is a schematic diagram of the LTE network architecture in the Background part.
Figure 2:
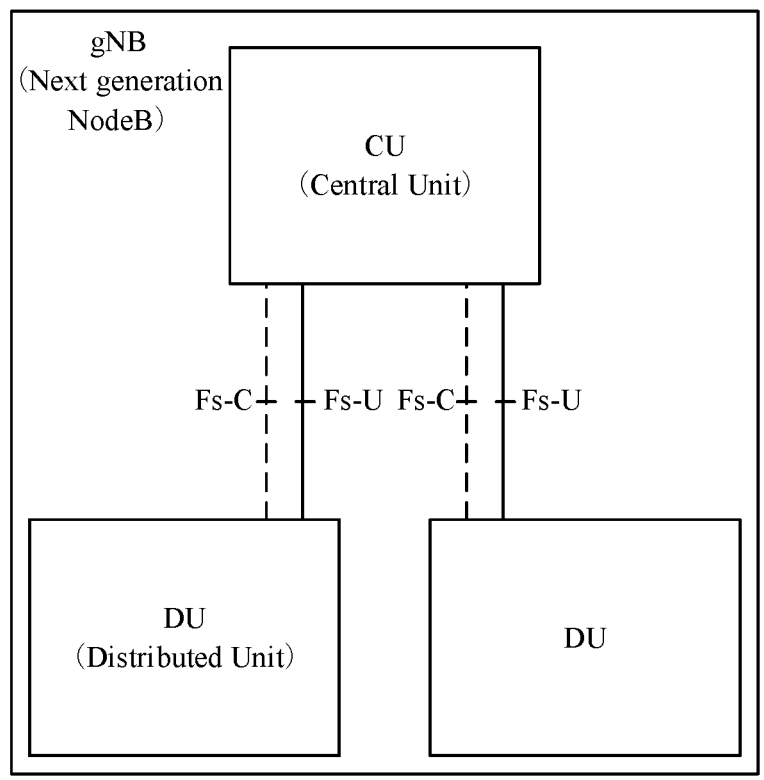
FIG. 2 is a schematic diagram of the CU-DU architecture in the Background part.
Figure 3:
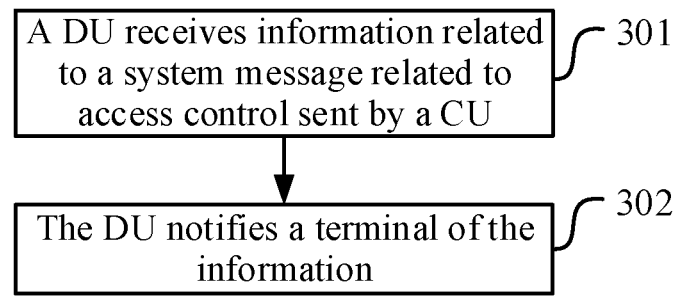
FIG. 3 is a schematic diagram of an implementation flow of a method of notifying a system message at the DU side in an embodiment of the present application.

FIG. 3 is a schematic diagram of an implementation flow of a method of notifying a system message at the DU side, and as shown, the method can include following steps.

Step 301: a DU receives information related to a system message sent by a CU.

Step 302: the DU notifies a terminal of the information.

In an implementation, the information related to the system message is access control auxiliary information of a part or all of service categories.

When the DU notifies the terminal of the information, the DU generates system information related to the system message according to the access control auxiliary information and sends the system information to the terminal.

In an implementation, the method can further include: the DU receives the access control auxiliary information of a part or all of service categories updated by the CU, generates the system information related to the system message according to the updated access control auxiliary information, and sends the system information to the terminal.

In an implementation, the information related to the system message is the related system message block generated by the CU according to the information related to the cell reselection parameter.

When the DU notifies the terminal of the information, the DU sends the system message block to the terminal at the corresponding scheduling time.

In an implementation, the system message block is sent by the CU to the DU node in form of container.

In an implementation, the method can further include: after receiving the overload information for a particular service category in a cell updated by the CU, the DU sends the overload information to the terminal at the corresponding scheduling time.

Accordingly, the following solution is provided for the CU.

Figure 4:
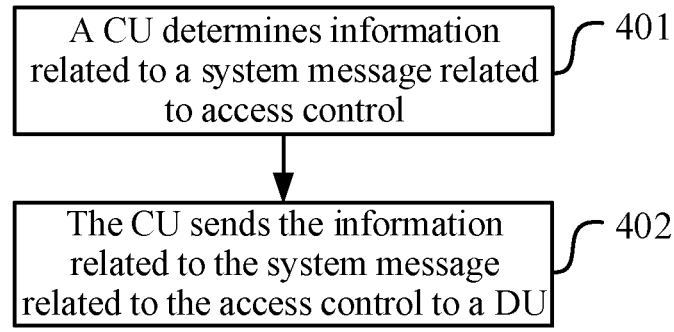
FIG. 4 is a schematic diagram of an implementation flow of a method of sending a system message at the CU side in an embodiment of the present application.

FIG. 4 is a schematic diagram of an implementation flow of a method of sending a system message at the CU side, and as shown, the method can include following steps.

Step 401: a CU determines information related to a system message.

Step 402: the CU sends the information related to the system message to a DU.

In an implementation, the information related to the system message is the access control auxiliary information of a part or all of service categories.

In an implementation, the method can further include: the CU sends the updated access control auxiliary information of a part or all of service categories to the DU.

In an implementation, the information related to the system message is the related system message block generated by the CU according to the information related to the cell reselection parameter.

In an implementation, the system message block is sent by the CU to the DU node in form of container.

In an implementation, the method can further include: the CU sends the updated overload information for a particular service category in a cell to the DU.

Examples will be illustrated below.

First embodiment is as follows.

This example is used to illustrate an initial configuration process.

Figure 5:
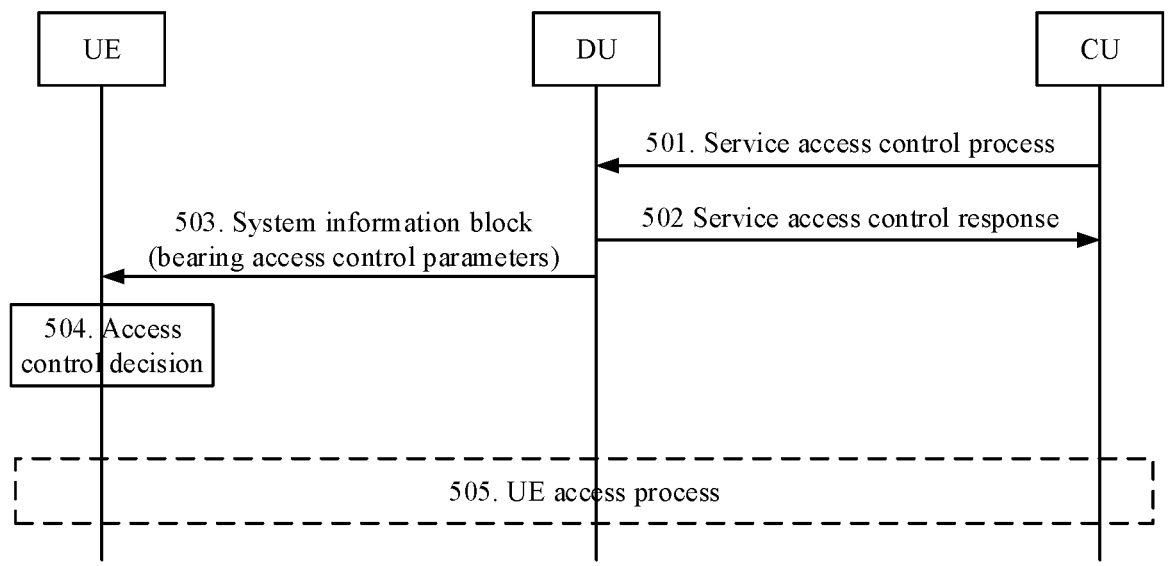
FIG. 5 is a schematic diagram of an implementation flow of the initial configuration process of a first embodiment of the present application.

FIG. 5 is a schematic diagram of an implementation flow of the initial configuration process of the first embodiment, and as shown, the process can include following steps.

Step 501: the CU initiates a service access control process.

Specifically, the CU forms access control configuration parameters (e.g., blocking probability factor or blocking time or other parameters) for some or all of service categories (access category) according to the particular algorithm, or the configurations of the OAM (Operations, Administration and Maintenance) and server, or the like; and notifies the DU of these configuration parameters through the common message process (e.g., separately-defined service control process, or using cell management related process or the like) of the CU-DU interface in accordance with the service categories.

Step 502: the DU performs the service access control response.

Optionally, the DU may reply to this common message process.

Step 503: the DU sends the system information block carrying and bearing access control parameters to the UE.

Specifically, the DU generates the system message block for a particular cell according to these parameter configurations related to the access control, and sends the system message block to the UE at the corresponding scheduling time.

Step 504: the UE makes the access control decision.

Specifically, when the UE initiates the service request, the UE needs to make the access control decision according to the information in the system message block.

Step 505: the UE initiates the service access process after the access decision is passed.

Second embodiment is as follows.

This example is used to illustrate another initial configuration process.

Figure 6:
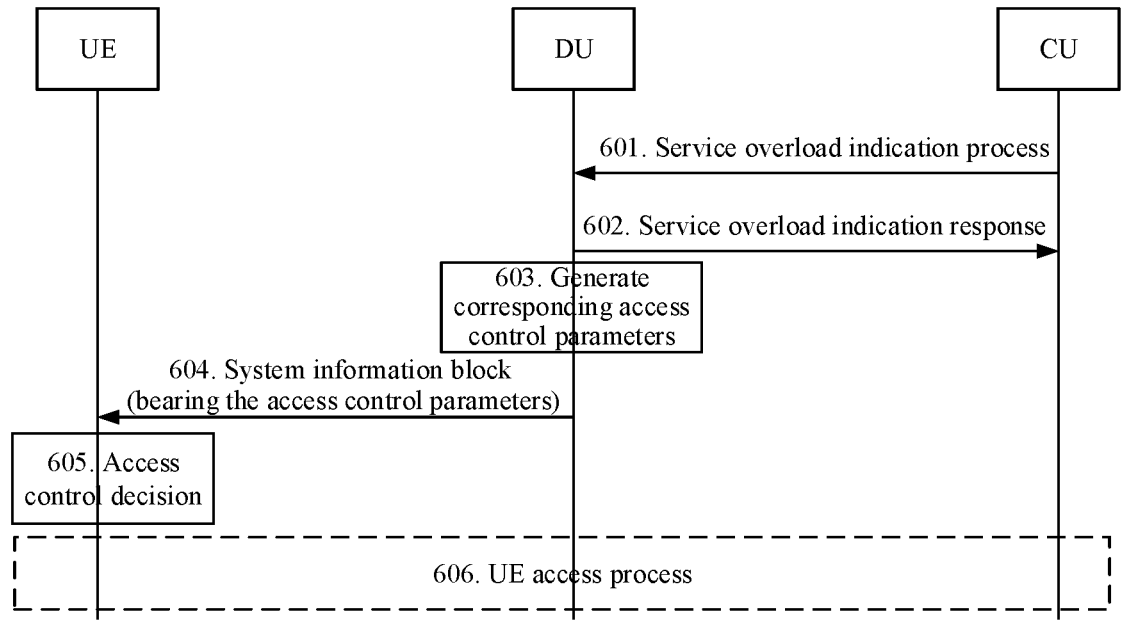
FIG. 6 is a schematic diagram of an implementation flow of the initial configuration process of a second embodiment of the present application.

FIG. 6 is a schematic diagram of an implementation flow of the initial configuration process of the second embodiment, and as shown, the process can include following steps.

Step 601: the CU initiates a service overload indication process.

Specifically, the CU generates overload level information (e.g., light, medium, heavy or the like (not limited to these three levels)) for some or all of service categories (access category) according to the particular algorithm, or configurations of the OAM, server and core network, or the like; and notifies the DU of the overload level information through the common message process (e.g., separately-defined overload indication process, or using cell management related process or the like) of the CU-DU interface in accordance with the service categories.

Step 602: the DU performs the service overload indication response.

Optionally, the DU may reply to this common message process.

Step 603: the DU generates corresponding access control parameters.

Specifically, the DU generates the parameter configuration information related to the access control of the corresponding cell according to the overload level information in combination with the particular algorithm of the DU, and then further generates the system message block for the cell and sends the system message block to the UE at the corresponding scheduling time.

Step 604: the DU sends the system information block carrying and bearing the access control parameters to the UE.

Step 605: the UE makes the access control decision.

Specifically, when the UE initiates the service request, the UE needs to make the access control decision according to the information in the system message block.

Step 606: the UE initiates the service access process after the access decision is passed.

Third embodiment is as follows.

This example is used to illustrate a configuration update process.

Figure 7:
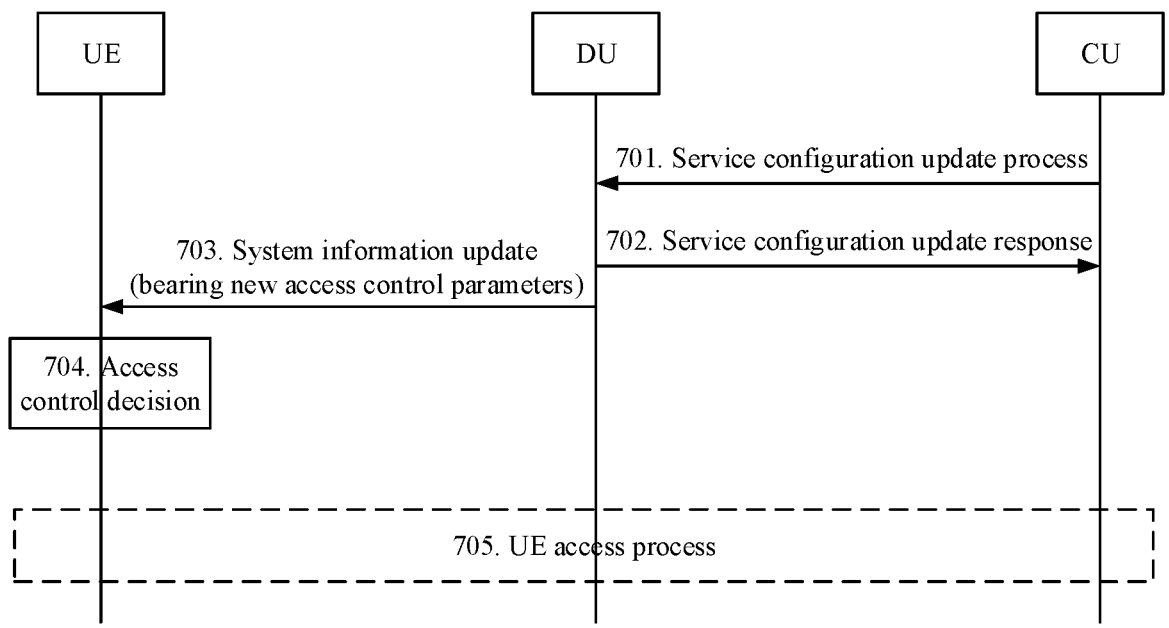
FIG. 7 is a schematic diagram of an implementation flow of the configuration update process of a third embodiment of the present application.

FIG. 7 is a schematic diagram of an implementation flow of the configuration update process of the third embodiment, and as shown, the process can include following steps.

Step 701: the CU initiates a configuration update process.

Specifically, the CU generates new access control configuration parameters for some or all of service categories (access category) according to the particular algorithm, or configurations of the OAM and server, or the like; and notifies the DU of these configuration parameters through the common message update process (e.g., separately-defined service configuration update process, or using cell management related process or the like) of the CU-DU interface in accordance with the service categories.

Step 702: the DU performs the service configuration update response.

Optionally, the DU may reply to this common message update process.

Step 703: the DU sends the system information block carrying and bearing new access control parameters to the UE.

Specifically, the DU generates a system update message for a particular cell according to these new parameter configurations related to the access control, and sends the system update message to the UE at the corresponding scheduling time.

Step 704: the UE makes the access control decision.

Specifically, when the UE initiates the service request, the UE needs to make the access control decision according to the new access control information.

Step 705: the UE initiates the service access process after the access decision is passed.

Fourth embodiment is as follows.

This example is used to illustrate another configuration update process.

Figure 8:
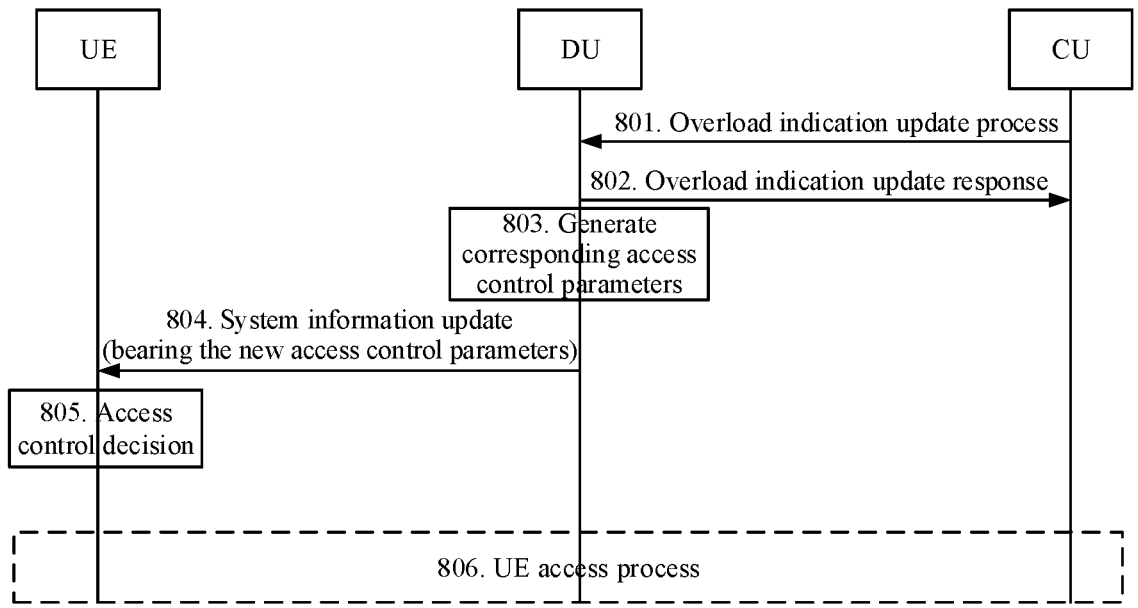
FIG. 8 is a schematic diagram of an implementation flow of the configuration update process of a fourth embodiment of the present application.

FIG. 8 is a schematic diagram of an implementation flow of the configuration update process of the fourth embodiment, and as shown, the process can include following steps.

Step 801: the CU initiates an overload indication update process.

Specifically, the CU generates new overload level information (e.g., light, medium, heavy and the like (not limited to these three levels)) for some or all of service categories (access category) according to the particular algorithm, or the real-time scheduling information of the services in the cell, or the like; and notifies the DU of the updated overload level information through the common message update process (e.g., separately-defined overload indication change process, or using cell management related process or the like) of the CU-DU interface in accordance with the service categories.

Step 802: the DU performs the overload indication update response.

Optionally, the DU may reply to this common message update process.

Step 803: the DU generates corresponding access control parameters.

Specifically, the DU generates new access control parameter information of the corresponding cell according to the new overload level information in combination with the particular algorithm of the DU, and then further generates the system update message for the cell and sends the system update message to the UE at the corresponding scheduling time.

Step 804: the DU sends the system information update message carrying and bearing the new access control parameters to the UE.

Specifically, when the UE initiates the service request, the UE needs to make the access control decision according to the new access control information.

Step 805: the UE makes the access control decision.

Step 806: the UE initiates the service access process after the access decision is passed.

Fifth is as follows.

This example is used to illustrate the configuration process of the cell reselection parameters.

Figure 9:
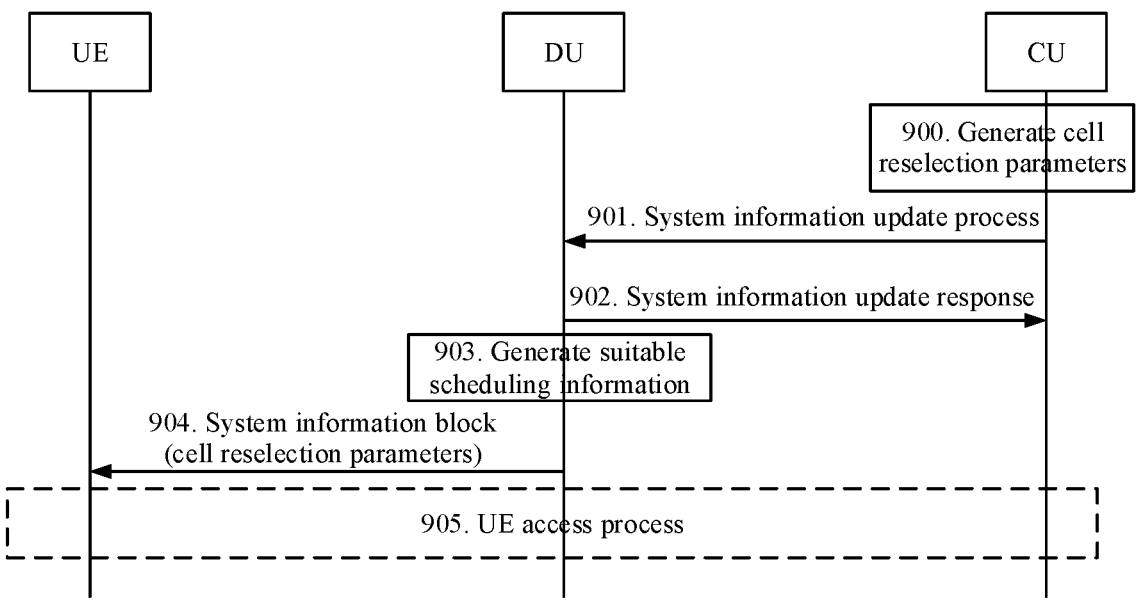
FIG. 9 is a schematic diagram of an implementation flow of the configuration process of the cell reselection parameter of a fifth embodiment of the present application.

FIG. 9 is a schematic diagram of an implementation flow of the configuration process of the cell reselection parameters of the fifth embodiment, and as shown, the process can include following steps.

Step 900: the CU generates cell reselection parameters.

Specifically, the CU generates the intra-frequency/inter-frequency/inter-system cell reselection parameters (e.g., reselection threshold and other parameters) according to the particular algorithm or the auxiliary information from other devices or the like, and generates the corresponding system message block from these configuration parameters.

Step 901: the CU initiates a system information update process.

Specifically, the CU notifies the DU of the generated system information block in form of container through the common message process (e.g., separately-defined system information update process, or using cell management related process or the like) of the CU-DU interface in accordance with the service categories.

Step 902: the DU performs the system information update response.

Optionally, the DU may reply to this common message process.

Step 903: the DU generates suitable scheduling information.

Specifically, the DU generates the suitable system message scheduling information according to these system parameter configurations.

Step 904: the DU sends the system information block carrying the cell reselection parameters to the UE.

Specifically, the DU sends the updated system message to the UE at the corresponding scheduling time.

Step 905: the UE may initiate the service access process after completing the interpretation of the system message.

Based upon the same inventive concept, embodiments of the present application further provide an apparatus of notifying a system message and an apparatus of sending a system message. Since the principles solving the problem of these apparatuses are similar to the method of notifying the system message and the method of sending the system message, the implementations of these apparatuses can refer to the implementations of the methods, and the repeated description thereof will be omitted here.

Figure 10:
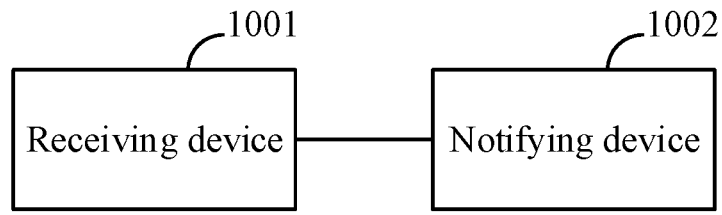
FIG. 10 is a structural schematic diagram of an apparatus of notifying a system message at the DU side in an embodiment of the present application.

FIG. 10 is a structural schematic diagram of an apparatus of notifying a system message at the DU side, and as shown, the apparatus can include: a receiving module 1001 configured to receive, at a DU, information related to a system message sent by a CU; a notifying module 1002 configured to notify, at the DU, a terminal of the information.

In an implementation, the notifying module is further configured, when the information related to the system message is the access control auxiliary information of a part or all of service categories, to generate the system information related to the system message according to the access control auxiliary information and send the system information to the terminal when notifying the terminal of the information.

In an implementation, the notifying module is further configured to receive the access control auxiliary information of the part or all of service categories updated by the CU, generate the system information related to the system message according to the updated access control auxiliary information, and send the system information to the terminal.

In an implementation, the notifying module is further configured, when the information related to the system message is a related system message block generated by the CU according to the information related to the cell reselection parameter, to send the system message block to the terminal at the corresponding scheduling time when notifying the terminal of the information.

In an implementation, the receiving module is further configured to receive the system message block sent by the CU to the DU node in form of container.

In an implementation, the notifying module is further configured, after receiving the overload information for a particular service category in a cell updated by the CU, to send the overload information to the terminal at the corresponding scheduling time.

Figure 11:
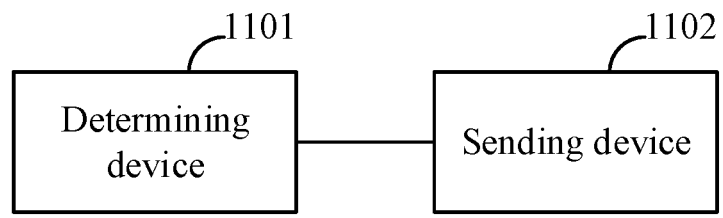
FIG. 11 is a structural schematic diagram of an apparatus of sending a system message at the CU side in an embodiment of the present application.

FIG. 11 is a structural schematic diagram of an apparatus of sending a system message at the CU side, and as shown, the apparatus can include: a determining module 1101 configured to determine information related to a system message; a sending module 1102 configured to send the information related to the system message to a DU.

In an implementation, the determining module is further configured to determine the information related to the system message as the access control auxiliary information of a part or all of service categories.

In an implementation, the sending module is further configured to send updated access control auxiliary information of the part or all of service categories to the DU.

In an implementation, the determining module is further configured to determine the information related to the system message as a related system message block generated by the CU according to the information related to the cell reselection parameter.

In an implementation, the sending module is further configured to send the system message block to the DU node in form of container.

In an implementation, the sending module is further configured to send the updated overload information for a particular service category in a cell to the DU.

For the sake of description, all the parts of the above-mentioned device are divided into various modules or units by function, which are described respectively. Of course, the functions of the various modules or units can be implemented in the same one or more software or hardware when the present application is implemented.

When the technical solution provided by embodiments of the present application is implemented, it can be implemented in such way as follows.

Figure 12:
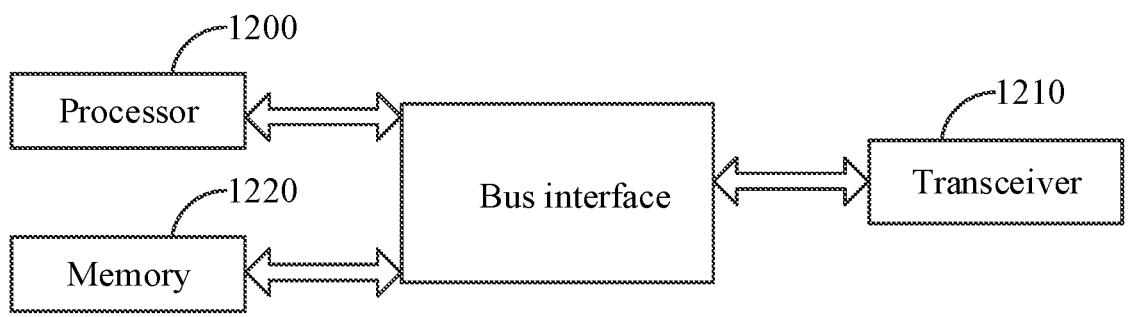
FIG. 12 is a structural schematic diagram of a DU in an embodiment of the present application.

FIG. 12 is a structural schematic diagram of a DU, and as shown, the DU includes: a processor 1200 configured to read programs in a memory 1220 to perform a process of: processing data according to a transceiver requirement; a transceiver 1210 configured to receive and transmit data under control of the processor 1200 to perform processes of: receiving information related to a system message sent by a CU; and notifying a terminal of the information.

In an implementation, the information related to the system message is access control auxiliary information of a part or all of service categories; when the DU notifies the terminal of the information, the DU generates the system information related to the system message according to the access control auxiliary information and sends the system information to the terminal.

In an implementation, the processes further include: the DU receives the access control auxiliary information of a part or all of service categories updated by the CU, generates the system information related to the system message according to the updated access control auxiliary information, and sends the system information to the terminal.

In an implementation, the information related to the system message is a related system message block generated by the CU according to the information related to the cell reselection parameter; when the DU notifies the terminal of the information, the DU sends the system message block to the terminal at the corresponding scheduling time.

In an implementation, the system message block is sent by the CU to the DU node in form of container.

In an implementation, the processes further include: after receiving overload information for a particular service category in a cell updated by the CU, the DU sends the overload information to the terminal at the corresponding scheduling time.

Here, in FIG. 12, the bus architecture can include any numbers of interconnected buses and bridges, and specifically link various circuits of one or more processors represented by the processor 1200 and the memory represented by the memory 1220. The bus architecture can further link various other circuits such as peripheral device, voltage regulator and power management circuit, which are all well known in the art and thus will not be further described again herein. The bus interface provides an interface. The transceiver 1210 can be a plurality of elements, i.e., include a transmitter and a receiver, and provide the units for communicating with various other devices over the transmission media. The processor 1200 is responsible for managing the bus architecture and general processing, and the memory 1220 can store the data used by the processor 1200 when performing the operations.

Figure 13:
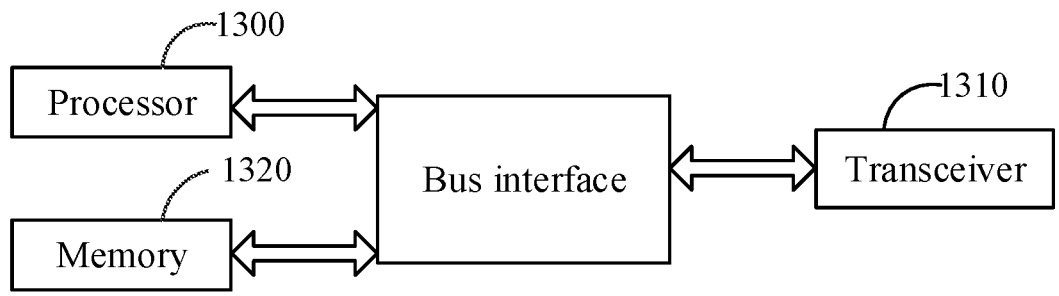
FIG. 13 is a structural schematic diagram of a CU in an embodiment of the present application.

FIG. 13 is a structural schematic diagram of a CU, and as shown, the CU includes: a processor 1300 configured to read the programs in a memory 1320 to perform a process of: determining information related to a system message; a transceiver 1310 configured to receive and transmit data under control of the processor 1300 to perform a process of: sending the information related to the system message to a DU.

In an implementation, the information related to the system message is access control auxiliary information of a part or all of service categories.

In an implementation, the process further includes: the CU sends updated access control auxiliary information of the part or all of service categories to the DU.

In an implementation, the information related to the system message is a related system message block generated by the CU according to the information related to the cell reselection parameter.

In an implementation, the system message block is sent by the CU to the DU node in form of container.

In an implementation, the process further includes: the CU sends updated overload information for a particular service category in a cell to the DU.

Here, in FIG. 13, the bus architecture can include any numbers of interconnected buses and bridges, and specifically link various circuits of one or more processors represented by the processor 1300 and the memory represented by the memory 1320. The bus architecture can further link various other circuits such as peripheral device, voltage regulator and power management circuit, which are all well known in the art and thus will not be further described again herein. The bus interface provides an interface. The transceiver 1310 can be a plurality of elements, i.e., include a transmitter and a receiver, and provide the units for communicating with various other devices over the transmission media. The processor 1300 is responsible for managing the bus architecture and general processing, and the memory 1320 can store the data used by the processor 1300 when performing the operations.

To sum up, in the technical solution provided by embodiments of the present application, the CU provides the access control auxiliary information of a part or all of service categories to the DU, and the DU node generates the system information related to the access control and sends the system information to the UE.

The CU generates the information such as intra-frequency/inter-frequency/inter-system cell reselection parameters and generates the related system message block, the CU transfers the information to the DU node in form of container, and the DU node sends the information to the UE at the corresponding scheduling time.

Here, for some or all of service categories, the CU node allocates the access control parameters (e.g., blocking probability factor or blocking time or the like) corresponding to these service categories for each cell, and notifies the DU node corresponding to the cell of these configuration parameters in accordance with service categories.

For some particular service categories, the CU is allowed to notify the DU node corresponding to the cell of the information on whether the service categories are overloaded according to the service load state of the CU or other auxiliary information or the like, and the DU can decide the access control parameters or the like for these particular service categories.

The DU may generate the corresponding system message in accordance with service categories according to the information such as the access control parameter values obtained by two above methods, and notify all the terminals in the cell of the system message.

The CU can update the access control parameters corresponding to a part or all of service categories, and notify the DU node.

The CU can update the overload information for the particular service category in the cell, and notify the DU node.

The CU generates the intra-frequency/inter-frequency/inter-system cell reselection parameters (e.g., reselection threshold and other parameters), and generates the corresponding system message block from these configuration parameters.

The CU notifies the DU of the generated system message block in form of container.

The DU sends the updated system message to the UE at the corresponding scheduling time.

An embodiment of the present application provides a computer storage medium for storing computer program instructions used by apparatuses provided by embodiments of the present application described above, where the computer storage medium contains the program for performing any one of the methods provided by embodiments of the present application described above.

The computer storage medium can be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

To sum up, embodiments of the present application provides an access control and system message processing solution under the CU-DU architecture, and the CU can provide the sufficient auxiliary information to the DU and the DU can generate the suitable system information according to the sufficient auxiliary information. Both of them coordinate to provide services for the UE, increasing the system efficiency and ensuring the good user experience.

It should be understood by those skilled in the art that embodiments of the present application can provide methods, systems and computer program products. Thus, the present application can take the form of hardware embodiments alone, software embodiments alone, or embodiments combining the software and hardware aspects. Also, the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, and an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, and the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, and a series of operation steps are performed on the computer or another programmable device to produce the computer-implemented processing. Thus, the instructions executed on the computer or another programmable device provide steps for implementing the functions specified in one or more processes of the flow charts and/or one or more blocks of the block diagrams.

Although the embodiments of the present application have been described, those skilled in the art can make additional alterations and modifications to these embodiments once they learn about the basic creative concepts. Thus, the attached claims are intended to be interpreted to include the embodiments as well as all the alterations and modifications falling within the scope of the present application.

Evidently those skilled in the art can make various modifications and variations to embodiments of the present application without departing from the spirit and scope of embodiments of the present application. Thus, the present application is also intended to encompass these modifications and variations therein as long as these modifications and variations to embodiments of the present application come into the scope of the claims of the present application and their equivalents.

What is claimed is:

1. A method of notifying a system message, comprising:
   receiving, by a Distributed Unit, DU, information related to a system message sent by a Central Unit, CU;
   notifying, by the DU, a terminal of the information;
   wherein:
   the information related to the system message is access control auxiliary information of a part or all of service categories;
   when the DU notifies the terminal of the information, the DU generates system information related to the system message according to the access control auxiliary information and sends the system information to the terminal;
   or,
   the information related to the system message is a related system message block generated by the CU according to information related to a cell reselection parameter;
   when the DU notifies the terminal of the information, the DU sends the system message block to the terminal at a corresponding scheduling time.

2. The method of claim 1, wherein in the condition that the information related to the system message is access control auxiliary information of a part or all of service categories, the method further comprises:
   receiving the access control auxiliary information of the part or all of service categories updated by the CU, generating, by the DU, the system information related to the system message according to the updated access control auxiliary information, and sending the system information to the terminal.

3. The method of claim 1, wherein in the condition that the information related to the system message is a related system message block generated by the CU according to information related to a cell reselection parameter, the system message block is sent by the CU to the DU node in form of container.

4. The method of claim 1, wherein in the condition that the information related to the system message is a related system message block generated by the CU according to information related to a cell reselection parameter, the method further comprises:
   after receiving overload information for a particular service category in a cell updated by the CU, sending, by the DU, the overload information to the terminal at the corresponding scheduling time.

5. A method of sending a system message, comprising:
   determining, by a CU, information related to a system message;
   sending, by the CU, the information related to the system message to a DU;
   wherein:
   the information related to the system message is access control auxiliary information of a part or all of service categories; when the DU notifies the terminal of the information, the DU generates system information related to the system message according to the access control auxiliary information and sends the system information to the terminal;
   or,
   the information related to the system message is a related system message block generated by the CU according to information related to a cell reselection parameter; when the DU notifies the terminal of the information, the DU sends the system message block to the terminal at a corresponding scheduling time.

6. The method of claim 5, wherein in the condition that the information related to the system message is access control auxiliary information of a part or all of service categories, the method further comprises:
   sending, by the CU, updated access control auxiliary information of the part or all of service categories to the DU.

7. The method of claim 5, wherein in the condition that the information related to the system message is a related system message block generated by the CU according to information related to a cell reselection parameter, the system message block is sent by the CU to the DU node in form of container.

8. The method of claim 5, wherein in the condition that the information related to the system message is a related system message block generated by the CU according to information related to a cell reselection parameter, the method further comprises:
sending, by the CU, updated overload information for a particular service category in a cell to the DU.

9. An apparatus of notifying a system message, comprising:
a memory, used for storing a program instruction; and
a processor, used for calling the program instruction stored in the memory to perform operations based on an obtained program, the operations comprising:
receiving, at a DU, information related to a system message sent by a CU;
notifying, at the DU, a terminal of the information;
wherein:
the information related to the system message is access control auxiliary information of a part or all of service categories;
the notifying the terminal of the information comprises:
generating system information related to the system message according to the access control auxiliary information and sending the system information to the terminal when notifying the terminal of the information;
or,
the information related to the system message is a related system message block generated by the CU according to information related to a cell reselection parameter;
the information related to the system message is a related system message block generated by the CU according to information related to a cell reselection parameter, and
the notifying the terminal of the information comprises:
sending the system message block to the terminal at a corresponding scheduling time when notifying the terminal of the information.

10. The apparatus of claim 9, wherein in the condition that the information related to the system message is access control auxiliary information of a part or all of service categories, the operations further comprise:
receiving the access control auxiliary information of the part or all of service categories updated by the CU, generating the system information related to the system message according to the updated access control auxiliary information, and sending the system information to the terminal.

11. The apparatus of claim 9, wherein in the condition that the information related to the system message is a related system message block generated by the CU according to information related to a cell reselection parameter,
the system message block is sent by the CU to the DU in form of container.

12. The apparatus of claim 11, wherein in the condition that the information related to the system message is a related system message block generated by the CU according to information related to a cell reselection parameter, the operations further comprise:
after receiving overload information for a particular service category in a cell updated by the CU, sending the overload information to the terminal at the corresponding scheduling time.

13. An apparatus of sending a system message, comprising:
a memory, used for storing a program instruction; and
a processor, used for calling the program instruction stored in the memory to perform operations in the method according to claim 5.

14. The apparatus of claim 13, wherein the determining information related to the system message comprises:
determining the information related to the system message as access control auxiliary information of a part or all of service categories;
wherein the operations further comprise:
sending updated access control auxiliary information of the part or all of service categories to the DU.

15. The apparatus of claim 13, wherein the determining information related to the system message comprises:
determining the information related to the system message as a related system message block generated by the CU according to information related to a cell reselection parameter;
wherein the sending the information related to the system message to the DU comprises:
sending the system message block to the DU in form of container.

* * * * *